US010918009B2

(12) United States Patent
Bardi et al.

(10) Patent No.: US 10,918,009 B2
(45) Date of Patent: Feb. 16, 2021

(54) ROTATABLE APPARATUS FOR METERING AND TREATING AGRICULTURAL GRANULES

(71) Applicants: BAYER CROPSCIENCE INC., Calgary (CA); AG GROWTH INTERNATIONAL, Winnipeg (CA)

(72) Inventors: Danick Joseph Bardi, Delisle (CA); Robert Reekie, Craven (CA); Timothy Strydhorst, Sandford (CA); Dallon Craig Mann, Battleford (CA)

(73) Assignees: Bayer Cropscience Inc., Calgary (CA); AG Growth International Inc., Winnipeg (CA)

( * ) Notice: Subject to any disclaimer, the term of this patent is extended or adjusted under 35 U.S.C. 154(b) by 0 days.

(21) Appl. No.: 14/767,692

(22) PCT Filed: Feb. 13, 2014

(86) PCT No.: PCT/CA2014/000103
§ 371 (c)(1),
(2) Date: Aug. 13, 2015

(87) PCT Pub. No.: WO2014/124518
PCT Pub. Date: Aug. 21, 2014

(65) Prior Publication Data

US 2015/0351312 A1 Dec. 10, 2015

Related U.S. Application Data

(60) Provisional application No. 61/765,209, filed on Feb. 15, 2013.

(51) Int. Cl.
*B01J 2/00* (2006.01)
*B01J 2/26* (2006.01)
(Continued)

(52) U.S. Cl.
CPC .................. *A01C 1/06* (2013.01); *A01C 1/00* (2013.01); *A01C 15/003* (2013.01); *B01J 2/006* (2013.01); *B01J 2/26* (2013.01); *B65G 37/00* (2013.01)

(58) Field of Classification Search
CPC ................. B01J 2/006; B01J 2/02; B01J 2/26
(Continued)

(56) References Cited

U.S. PATENT DOCUMENTS 3,734,777 A * 5/1973 Bratschitsch ............ A01C 1/08 118/303
3,841,263 A * 10/1974 Rohloff .................... A01C 1/00 118/303
(Continued)

FOREIGN PATENT DOCUMENTS

CA 1034104 A1 7/1978
WO WO 2014/008571 A1 1/2014

OTHER PUBLICATIONS

PCT International Search Report for PCT/CA2014/000103, 2 pages, dated May 8, 2014.

*Primary Examiner* — David J Parsley
(74) *Attorney, Agent, or Firm* — Patterson, Thuente Pedersen, P.A.

(57) ABSTRACT

An agricultural apparatus for metering and treating granules such as seeds and granular crop additives. The apparatus comprises a metering device rotatably mounted on a spray chamber, the spray chamber connected to a conveyance device intake such as an auger. The metering device is rotatable between first (use) and second (transport) positions.

16 Claims, 22 Drawing Sheets

(51) Int. Cl.

| | |
|---|---|
| ***A01C 1/06*** | (2006.01) |
| ***B65G 37/00*** | (2006.01) |
| ***A01C 15/00*** | (2006.01) |
| ***A01C 1/00*** | (2006.01) |

(58) Field of Classification Search
USPC .................................................. 118/303, 324
See application file for complete search history.

(56) References Cited

U.S. PATENT DOCUMENTS 3,968,771 A * 7/1976 Walgenbach ............ A01C 1/08 118/303
4,023,525 A 5/1977 Weber
4,079,696 A * 3/1978 Weber ...................... A01C 1/08 118/417
4,419,037 A * 12/1983 Niewold .............. B65G 41/002 222/163
4,465,016 A * 8/1984 Weber ...................... A01C 1/08 118/303
4,503,803 A 3/1985 Barnes
4,586,459 A 5/1986 Schultz
4,895,106 A * 1/1990 Barnes ..................... A01C 1/08 118/19
5,119,756 A * 6/1992 Norton ...................... B01F 7/08 118/407
6,155,185 A * 12/2000 Memory .................. A01C 1/06 111/200
7,273,314 B1 * 9/2007 Whited ................... B01F 5/223 118/303
7,487,892 B1 * 2/2009 Hirsch .................. G01F 13/001 222/240

* cited by examiner

ROTATABLE APPARATUS FOR METERING AND TREATING AGRICULTURAL GRANULES

RELATED APPLICATIONS

This application is a National Phase entry of PCT Application No. PCT/CA2012/000641, filed Jul. 9, 2012, said application being hereby incorporated by reference in its entirety.

FIELD OF THE INVENTION

The present invention relates to treatment apparatuses for agricultural granules such as seed, and more particularly to treatment apparatuses that incorporate granule metering.

BACKGROUND OF THE INVENTION

It is well known in the agricultural arts to apply various treatments to seeds before planting, in an effort to reduce the amount of such treatment that would otherwise be required were it to be applied to a field after planting. For example, treatments may include the application of agrochemical products such as fertilizers, herbicides, insecticides, pesticides, nematicides and fungicides, and normally take the form of liquid chemical that is sprayed onto the seed. While seed treatment apparatuses are commercially available, it is more common to see a farmer spray treatment directly onto seed just before it is drawn up an auger, the auger being employed to mix the treated seed in an effort to spread the treatment coating over as much seed surface as possible before planting. Such manual application, however, normally results in overuse of expensive treatment (due to a failure to properly meter the seed and control the treatment amount) and loss of treatment (particularly due to wind) and may even have health implications depending on the nature and toxicity of the particular treatment being applied, although manual application may also result in too little treatment being applied and therefore a reduction in the desired effect.

Various seed treatment apparatuses have been disclosed in the prior art, some of which have been made commercially available, but it has been found that they generally fail to consistently enable an optimal treatment level or are of limited or no use for the high-throughput seed treatment required in a commercial farming operation. The problem of treatment waste and optimized application rates in a commercial farming context has not been canvassed to a significant extent in the prior art or the technical field itself. In response, Patent Cooperation Treaty Application No. PCT/CA2012/000641 to Bardi disclosed a novel metering and treating apparatus and method that meters seed based on volume and uses mass flow based on seed density to calculate optimal treatment application rate for a given seed type, in an apparatus configuration capable of use with on-farm storage units. The Bardi apparatus combined metering and treatment functionality in a single standalone unit, to be used with an auger and boot or similar transport mechanism to help ensure even coating of the treated seed.

Although the Bardi apparatus accordingly represented a significant development in the art, it was determined that its standalone construction could limit its portability and utility in a commercial farming operation. What is needed, therefore, is a means for providing apparatuses like the Bardi apparatus with ease of transport and use without negatively impacting the metering/treating functionality.

SUMMARY OF THE INVENTION

According to an aspect of the present invention there is provided an apparatus for metering and treating agricultural granules, the apparatus comprising:

- a conveyance device having an inlet;
- a treatment chamber mounted adjacent the inlet of the conveyance device; and
- a metering device configured to receive agricultural granules at an intake end and eject the agricultural granules at an outlet end, the metering device rotatably coupled to the treatment chamber such that the agricultural granules ejected from the outlet end pass through the treatment chamber for treatment therein and thence into the inlet of the conveyance device;
- wherein the metering device can be rotated between a first position for positioning under an agricultural granule source for receiving agricultural granules therefrom for metering and a second position adjacent the conveyance device for transport.

In exemplary embodiments of the present invention, the agricultural granules may be selected from the group consisting of seeds, fertilizer granules and granular field additives, and the treatment may be a liquid treatment selected from the group consisting of fertilizers, herbicides, insecticides, pesticides, nematicides and fungicides. In another exemplary embodiment the seeds are selected from the group consisting of seeds of cereals like wheat, barley, rye, oats, triticale; from pulses like lentils, peas, beans, and lupins; and soybean seeds, canola seeds, or rapeseed. Most preferred are cereal seeds and soybean seeds. The conveyance device may be selected from the group consisting of an auger, a mixer and a conveyor. Where the conveyance device is an auger and the auger comprises a screw in a casing wherein the screw is configured for rotation on a shaft to displace the agricultural granules away from the inlet, a portion of the screw preferably extends past an inlet end of the casing and into the treatment chamber. The metering device preferably comprises a conveyor within a housing, the conveyor configured to transport the agricultural granules from the intake end to the outlet end, and the metering device preferably comprises a motor for driving the conveyor. The apparatus may also comprise a motor to drive rotation of the metering device between the first and second positions.

The metering device is preferably rotatably coupled to the treatment chamber by means of a coupler allowing rotational movement of the metering device relative to the treatment chamber and in a plane parallel to a mounting surface of the treatment chamber. The coupler may comprise a round disc having opposed first and second generally flat surfaces, the metering device mounted on the first generally flat surface, the second generally flat surface held slidably against the mounting surface of the treatment chamber by at least one retention tab, such that the round disc is rotatable while slidably retained against the mounting surface. The coupler may alternatively comprise a stepped plate having opposed first and second generally flat surfaces, the metering device mounted on the first generally flat surface, the second generally flat surface held slidably against the mounting surface of the treatment chamber by at least one retention tab, such that the stepped plate is rotatable while slidably retained against the mounting surface, the first generally flat surface being of larger diameter than the second generally flat surface. The coupler may comprise at least one nozzle in communication with a treatment source, the at least one nozzle configured to spray the treatment on the agricultural granules as they pass through the treatment chamber; alternatively, the coupler may comprise at least one atomizer in communication with a treatment source, the at least one atomizer configured to atomize the treatment on the agricultural granules as they pass through the treatment chamber. The coupler and the treatment chamber preferably comprise corresponding apertures allowing the agricultural granules to pass therethrough from the metering device outlet end into the treatment chamber.

The treatment chamber may comprise at least one nozzle in communication with a treatment source, the at least one nozzle configured to spray the treatment on the agricultural granules as they pass through the treatment chamber. Alternatively, the treatment chamber may comprise at least one atomizer in communication with a treatment source, the at least one atomizer configured to atomize the treatment on the agricultural granules as they pass through the treatment chamber.

A detailed description of exemplary embodiments of the present invention is given in the following. It is to be understood, however, that the invention is not to be construed as being limited to these embodiments.

BRIEF DESCRIPTION OF THE DRAWINGS

In the accompanying drawings, which illustrate exemplary embodiments of the present invention.

Figure 1A:
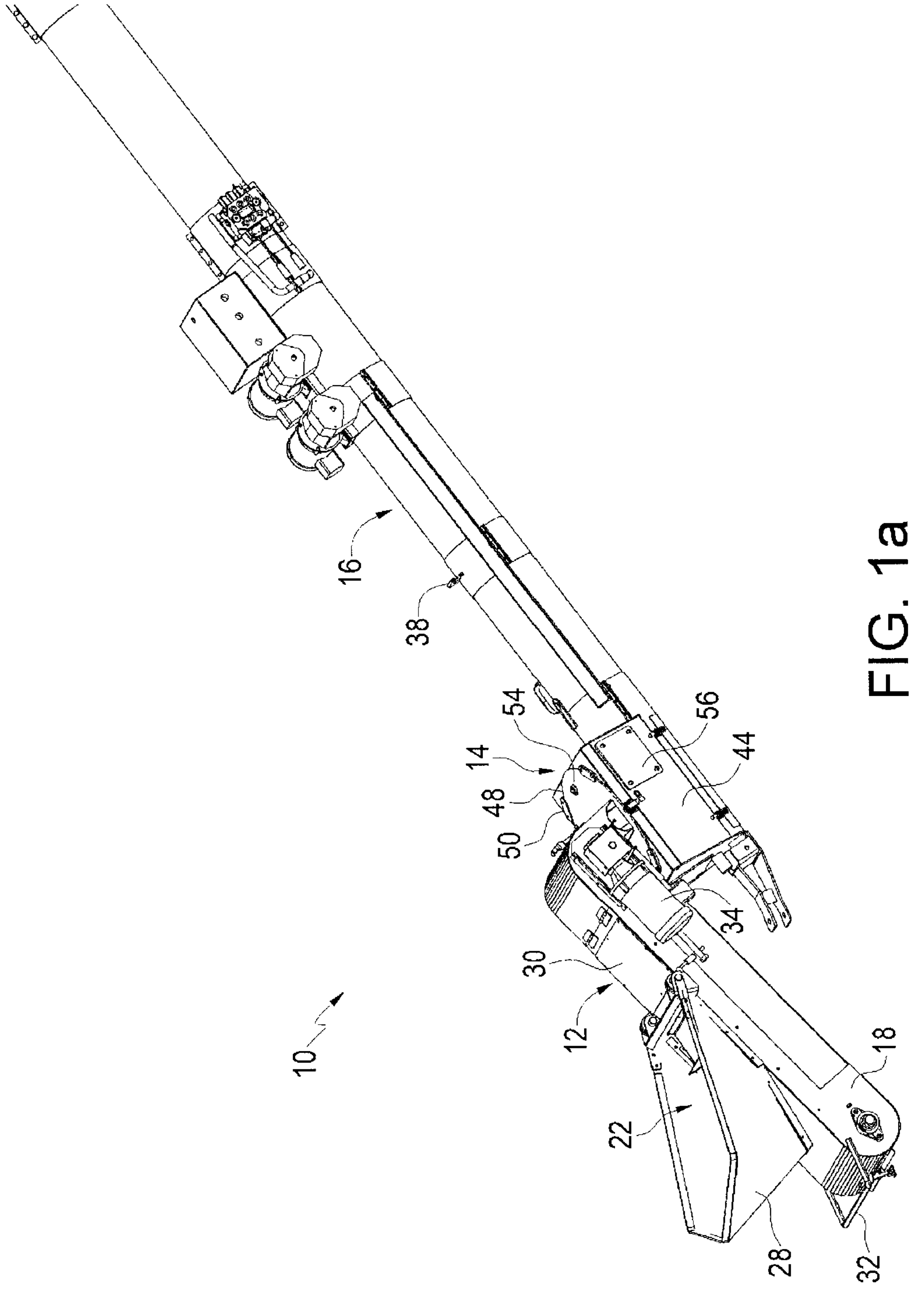
FIG. 1*a* is a front perspective view of an apparatus according to a first embodiment of the present invention, in the extended position.

Exemplary embodiments of the present invention will now be described with reference to the accompanying drawings.

DETAILED DESCRIPTION OF EXEMPLARY EMBODIMENTS

Referring now to the accompanying drawings, exemplary embodiments of an apparatus according to the present invention are illustrated. It is to be understood that the illustrated embodiments are exemplary only and other embodiments may properly fall within the scope of the claims.

In the following description of exemplary embodiments, reference is made to metering and treatment of seeds, but it will be understood that other types of agricultural granules, such as but not limited to granular field additives, are intended to be included within the scope of materials that are capable of metering and treatment in accordance with the present invention. One skilled in the art will be able to readily determine a variety of agricultural granules mat could be metered and treated using an apparatus in accordance with the present invention. Also, the exemplary embodiments discuss application of liquid treatment, but the present invention may be used for the application of powdered substances, for example a peat-based inoculant, with appropriate modification of spray means as would be within the knowledge of one skilled in the art.

Referring now in detail to FIGS. 1*a* through 4*b*, an apparatus 10 according to a first exemplary embodiment of the present invention is illustrated. The apparatus 10 is shown in the extended position in FIGS. 1*a* through 2*b*, and in the retracted position in FIGS. 3 through 4*b*, as will be described below.

The apparatus 10 comprises a metering device 12 generally in accordance with the Bardi disclosure referenced above (although other metering devices with similar form and functionality could be used, as would be obvious to one skilled in the art), a discrete spray chamber 14 (rather than the integrated spray chamber of Bardi) and an auger 16. As can be seen in FIGS. 2*a*, 2*b*, 4*a* and 4*b*, the metering device 12 comprises a conveyor 20 within a housing 18, the conveyor 20 positioned generally horizontally to provide a low profile to enable positioning of the metering device 12 underneath a hopper-bottom bin or similar seed storage unit, and the conveyor 20 is provided with cleats 26 configured to move seed on the top of the conveyor 20 from the seed intake 22 (which receives seed through the collar or hopper 28) to the seed outlet 24. While various drive mechanisms are possible within the scope of the present invention, a conventional motor 34 is shown in the illustrated embodiment as being mounted on a side of the housing 18 for providing power to the conveyor 20, the motor 34 being connected to a power source and a controller in a manner determinable by those skilled in the art. The housing is provided with an observation window 30, a handle 32 and a bolt 36. The bolt 36 is configured to be received in the recess 38, as will be described below.

The apparatus 10 further comprises an auger 16, which is conventional in most respects unless stated otherwise herein. As can be seen in FIGS. 2*a*, 2*b*, 4*a* and 4*b*, the auger 16 comprises a screw 40 formed on a shaft 42, rotation of which allows displacement of seed upwards through the auger 16 interior to an outlet. The shaft 42 is powered by conventional means. The intake end of the shaft 42 and screw 40 project past the intake end of the auger 16 and are located in the spray chamber 14, thereby displacing seed from the bottom of the spray chamber 14 toward the auger 16 interior.

The apparatus 10 further comprises a spray chamber 14, which provides the connection means between the metering device 12 and the auger 16 and contains the seed-spraying activity while the seed passes downwardly from the metering device 12 to the screw 40 of the auger 16. The spray chamber 14 comprises a housing 44, which housing 44 can be seen in detail in FIGS. 6*a* through 6*e*. The housing 44 is provided with a circular aperture 46 on an upper or mounting surface thereof, surrounded at spaced intervals by retention tabs 50. The housing 44 also comprises observation windows 56 (which would preferably be covered by a clear plastic, not shown).

Figure 5C:
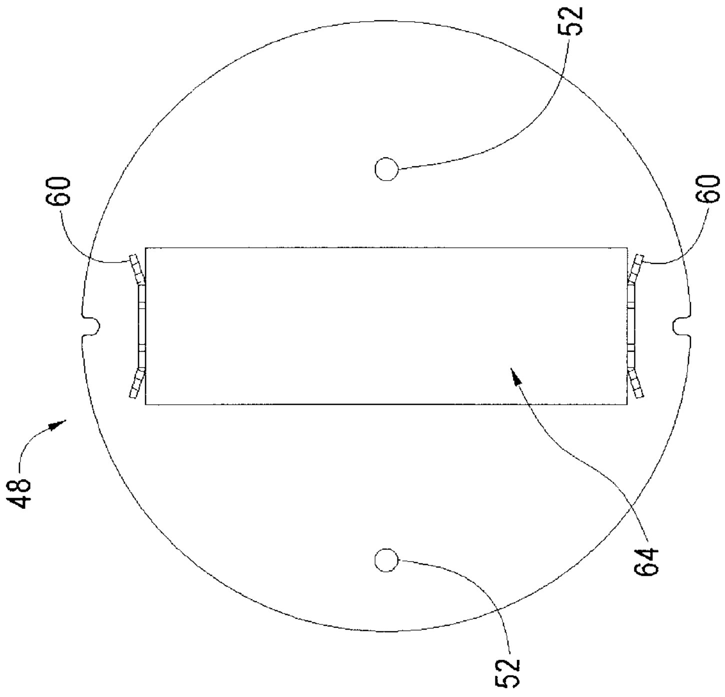
FIGS. 5*a*, 5*b* and 5*c* are detailed views of a rotatable plate according to the first embodiment of the present invention.
Figure 5B:
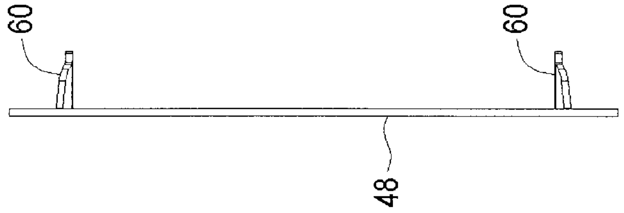
Figure 5A:
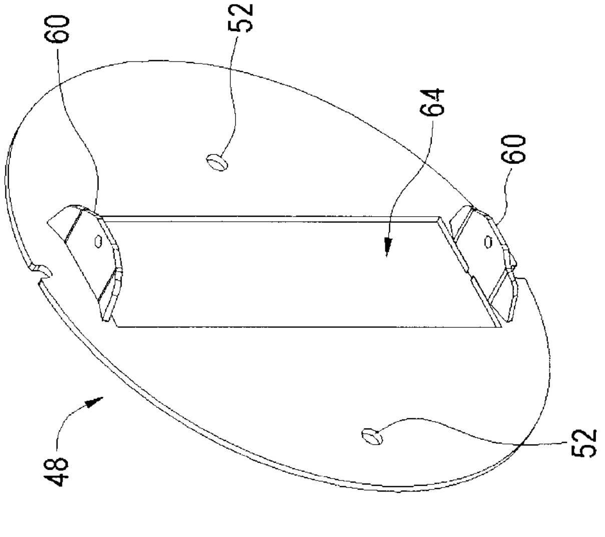
Figure 6B:
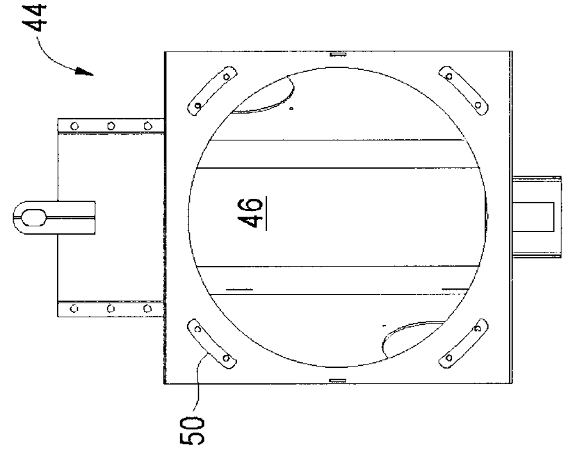
FIGS. 6*a*, 6*b*, 6*c*, 6*d* and 6*e* are detailed views of a spray chamber housing according to the first embodiment of the present invention.
Figure 6E:
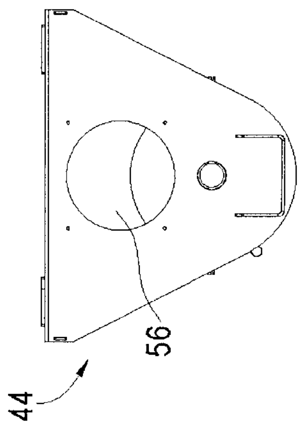
Figure 6A:
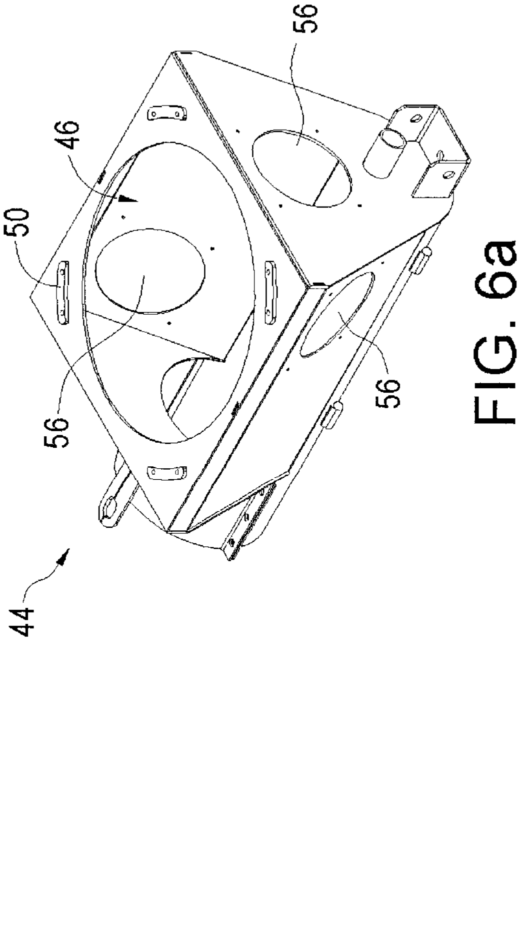
Figure 6D:
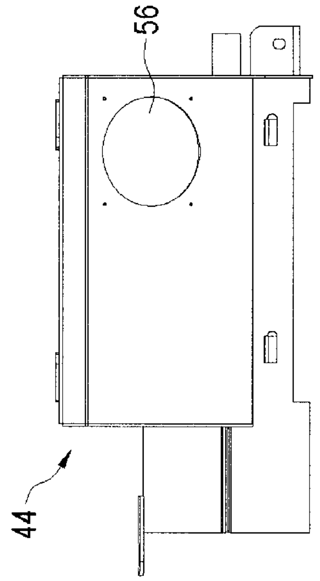
Figure 6C:
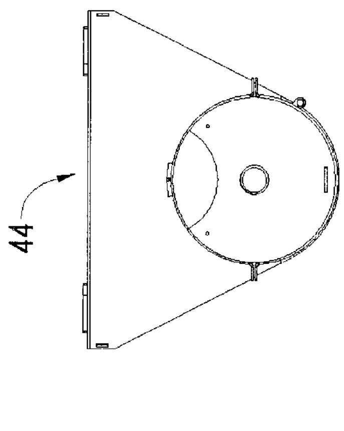
Figure 7A:
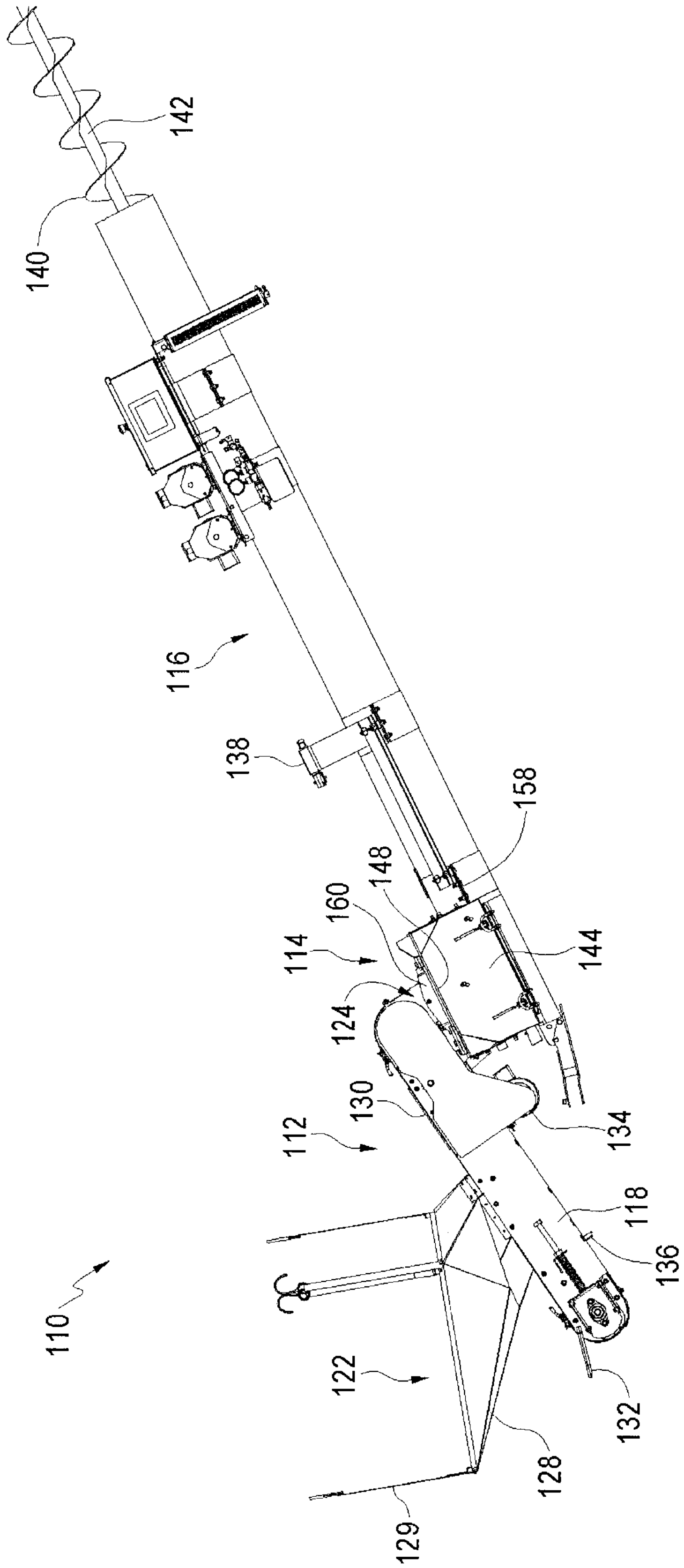
FIG. 7*a* is a side elevation view of an apparatus according to a second embodiment of the present invention, in the extended position.
Figure 7B:
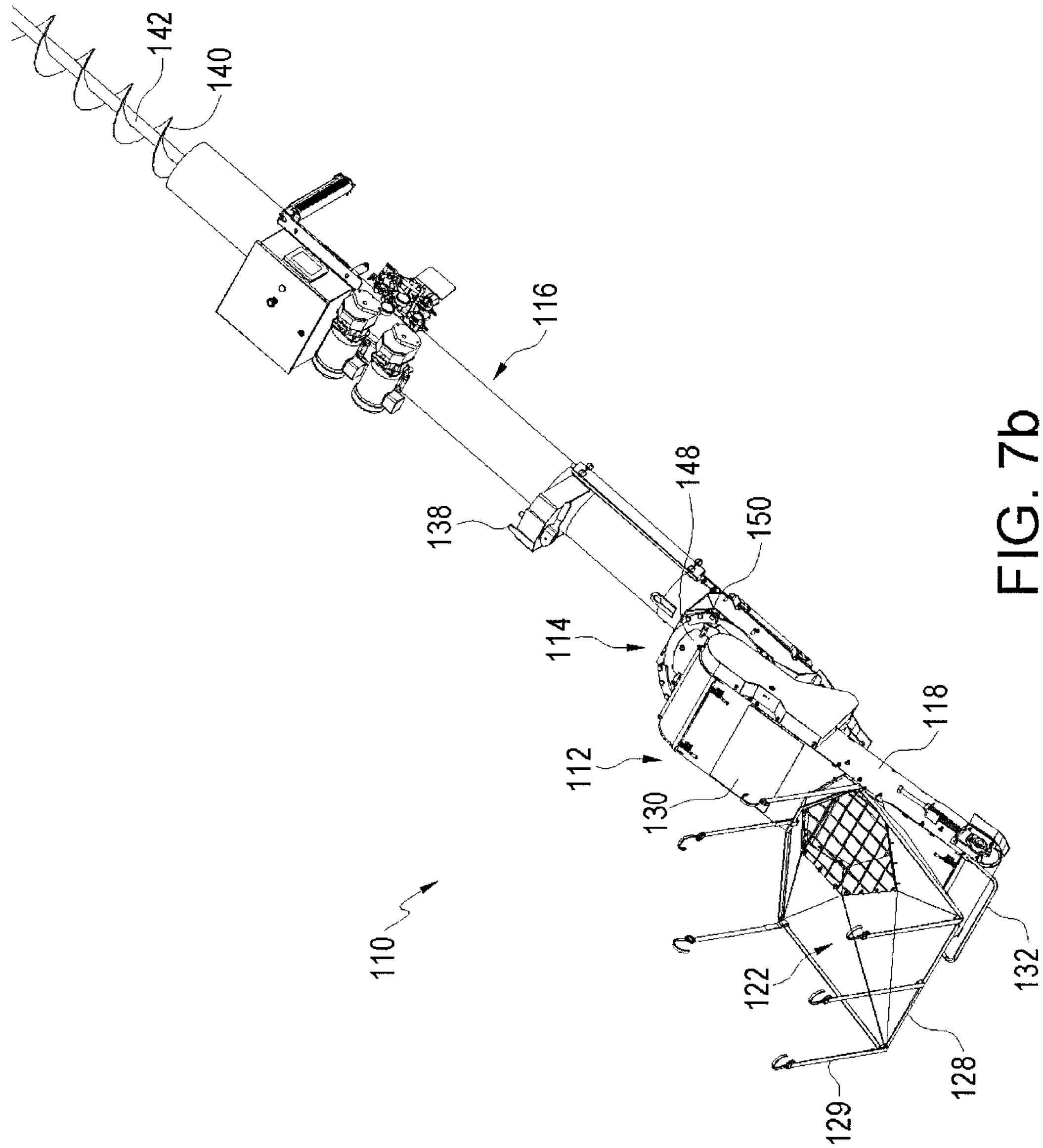
FIG. 7*b* is a front perspective view of the apparatus of FIG. 7*a;*
Figure 7C:
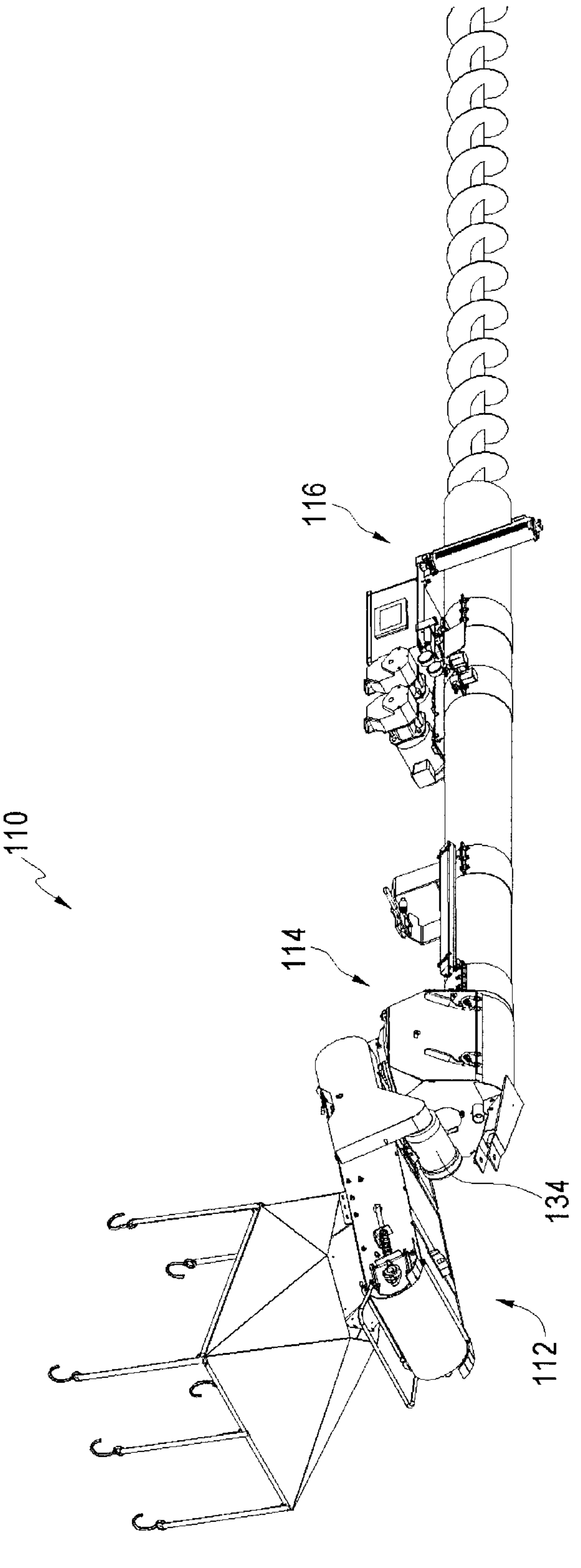
FIG. 7*c* is a front perspective view of the apparatus of FIG. 7*a;*
Figure 7D:
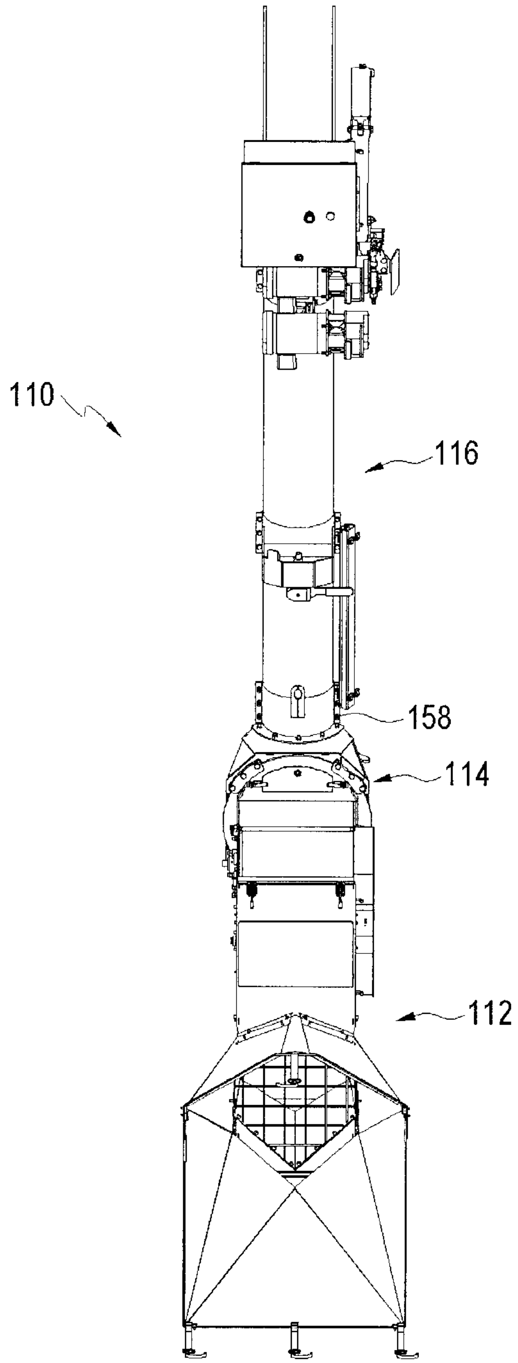
FIG. 7*d* is a top plan view of the apparatus of FIG. 7*a;*
Figure 7E:
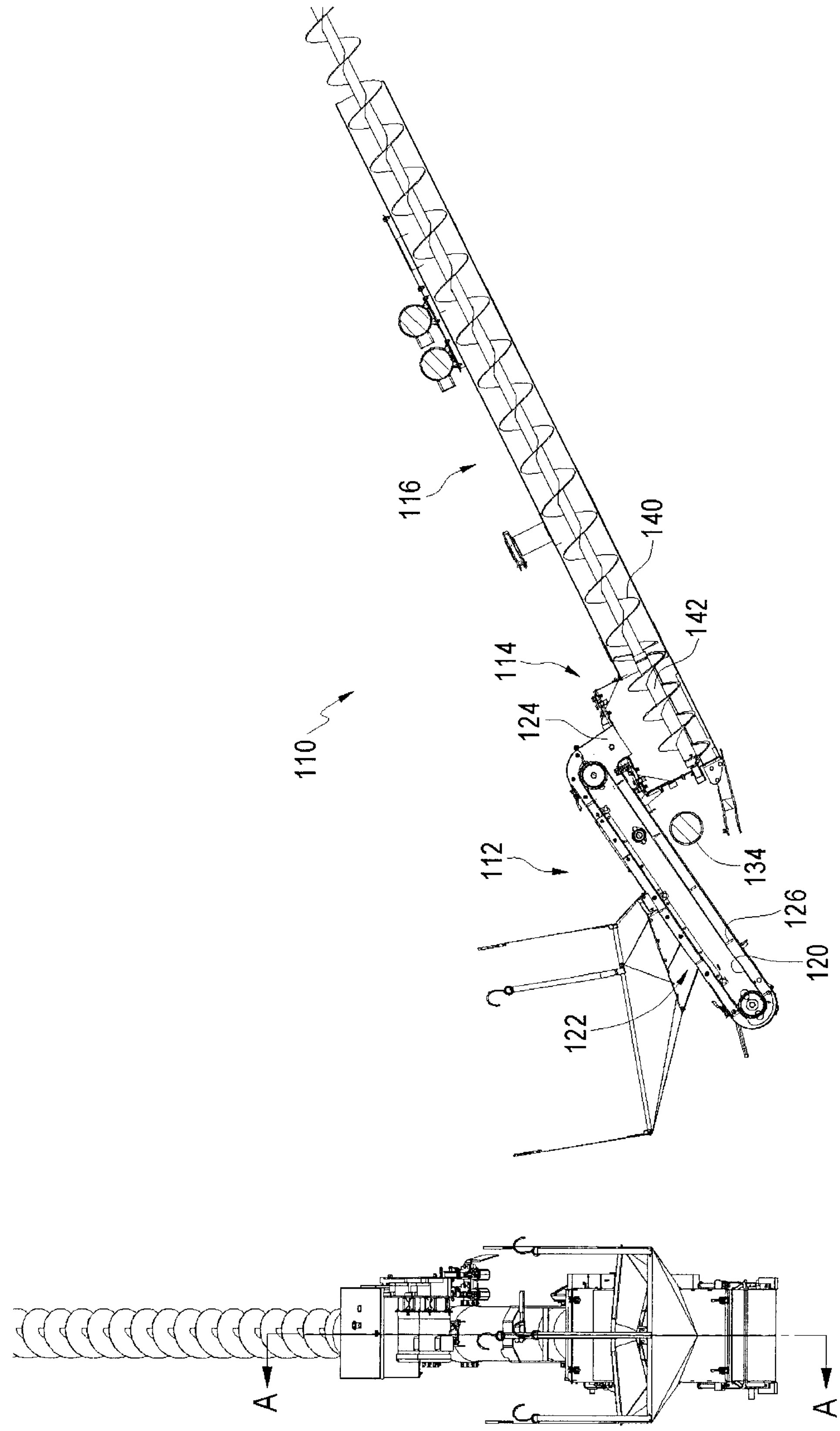
FIG. 7*e* is a sectional view of the apparatus of FIG. 7*a;*
Figure 8A:
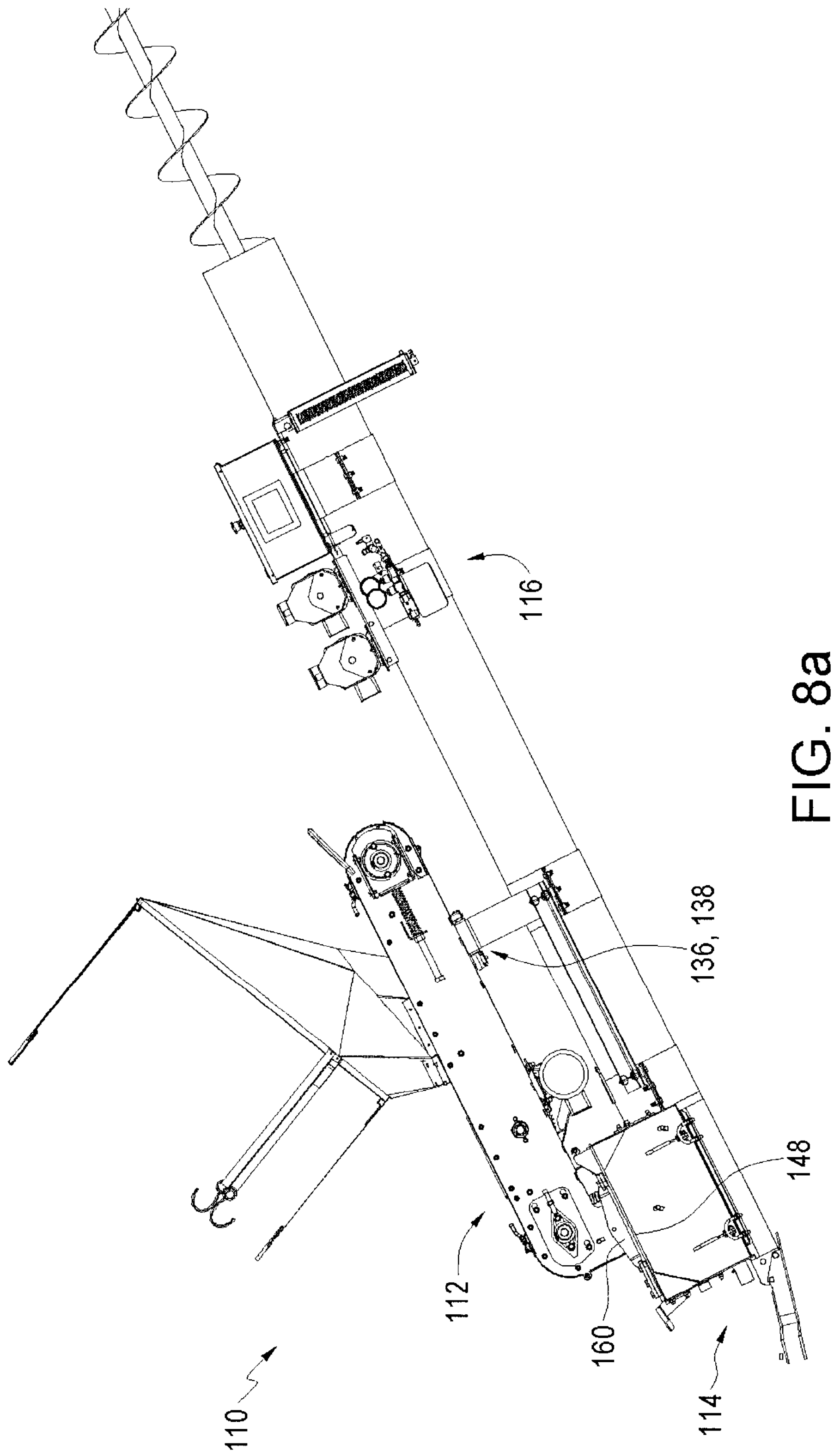
FIG. 8*a* is a side elevation view of an apparatus according to the second embodiment of the present invention, in the retracted position.
Figure 8B:
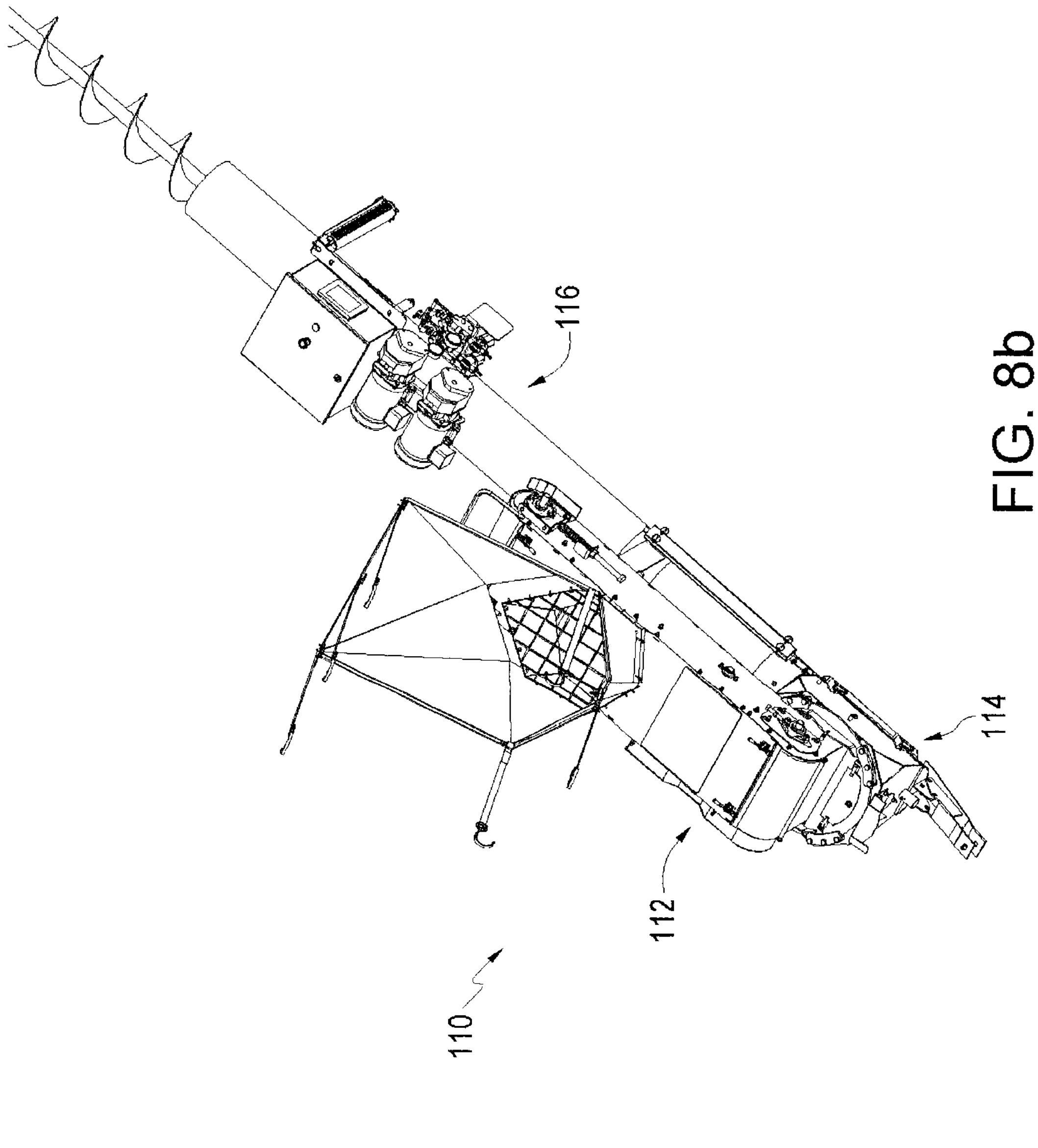
FIG. 8*b* is a front perspective view of the apparatus of FIG. 8*a;*
Figure 8C:
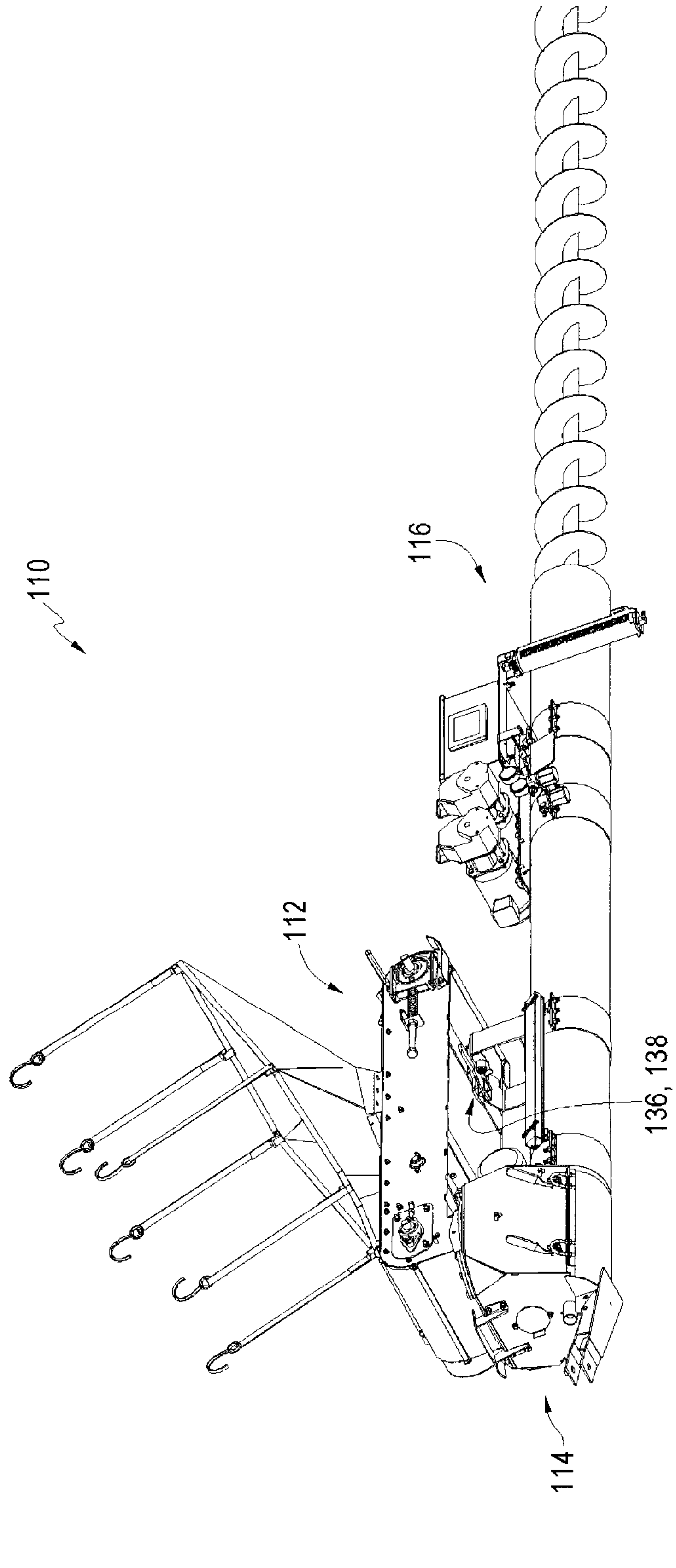
FIG. 8*c* is a front perspective view of the apparatus of FIG. 8*a;*
Figure 8D:
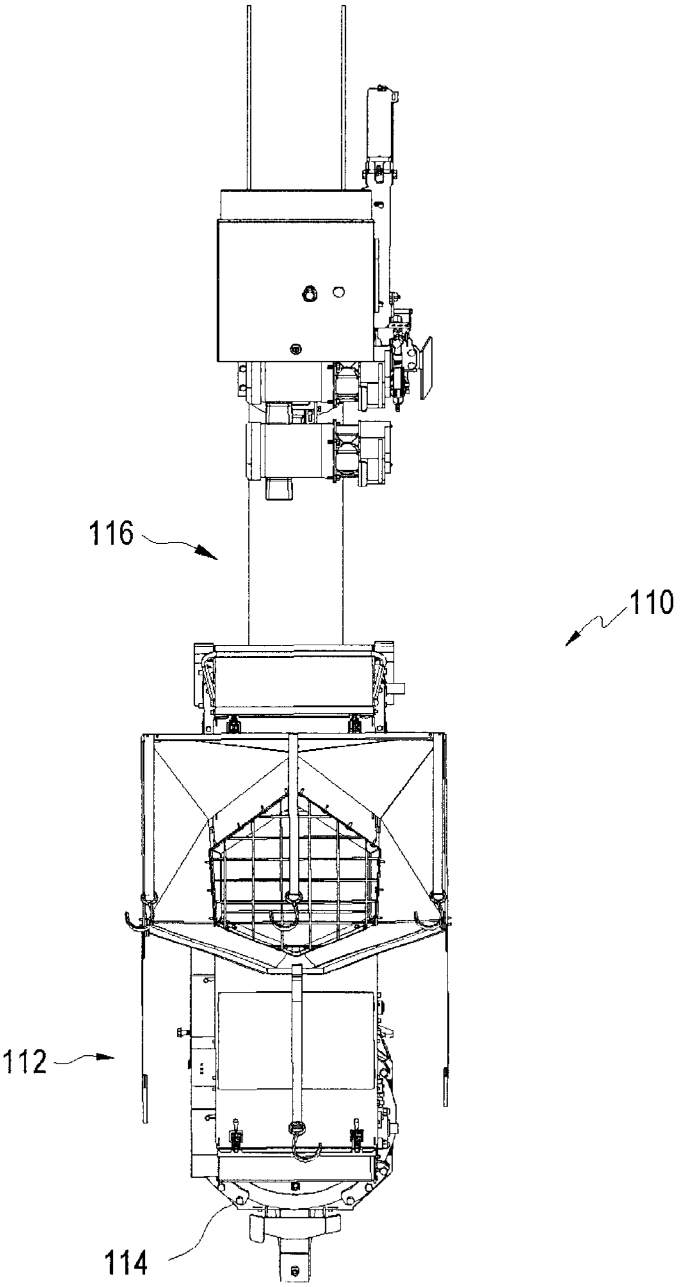
FIG. 8*d* is a top plan view of the apparatus of FIG. 8*a;*
Figure 8E:
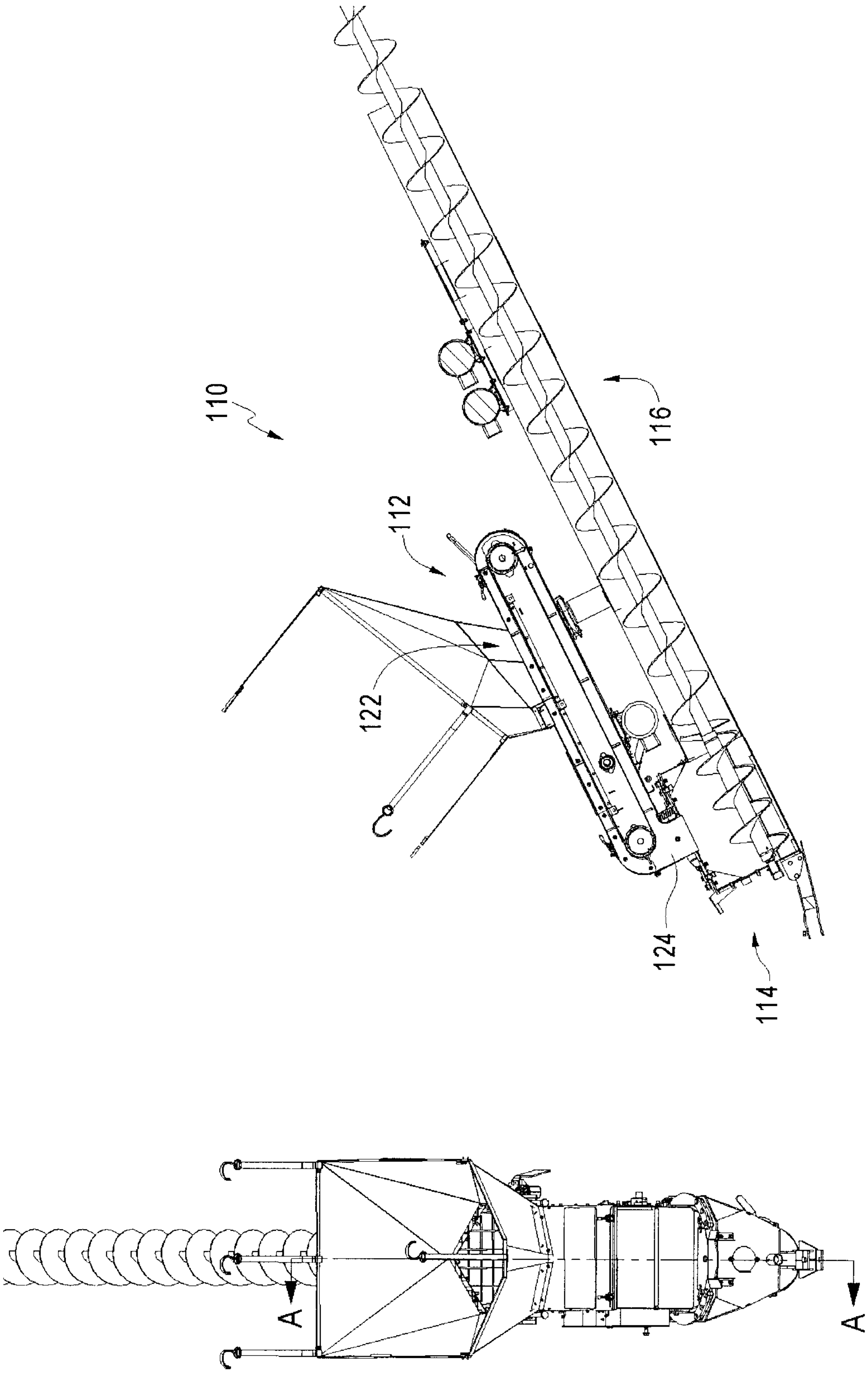
FIG. 8*e* is a sectional view of the apparatus of FIG. 8*a;*

The spray chamber 14 also comprises a rotatable plate 48 which is circular in plan and of larger diameter than the aperture 46. The rotatable plate 48 sits on top of the aperture 46 and is held in place by the tabs 50, with sufficient gap between the tabs 50 and the rotatable plate 48 to allow the latter to rotate in place while still being held in position over the aperture 46. The rotatable plate 48 can be seen in detail in FIGS. 5*a* through 5*c*. The rotatable plate 48 comprises two nozzle apertures 52, a central opening 64 and two mounting tabs 60. The two nozzle apertures 52 are configured to receive spray nozzles 54 for receiving treatment to apply to seed as it falls through the spray chamber 14 (the pump, treatment source, treatment lines and related elements are not shown, but would be conventional and therefore known to those skilled in the art). The central opening 64 is positioned above the aperture 46.

The term "rotatable" is used herein to refer to a coupled connection means allowing rotational movement, in a plane, of one component of the apparatus relative to an adjacent component. In the exemplary embodiments, the metering device is rotatably coupled to the treatment chamber by means of a coupler allowing rotational movement of the metering device relative to the treatment chamber. The rotation occurs in a plane parallel to an upper mounting surface of the treatment chamber.

Figure 1B:
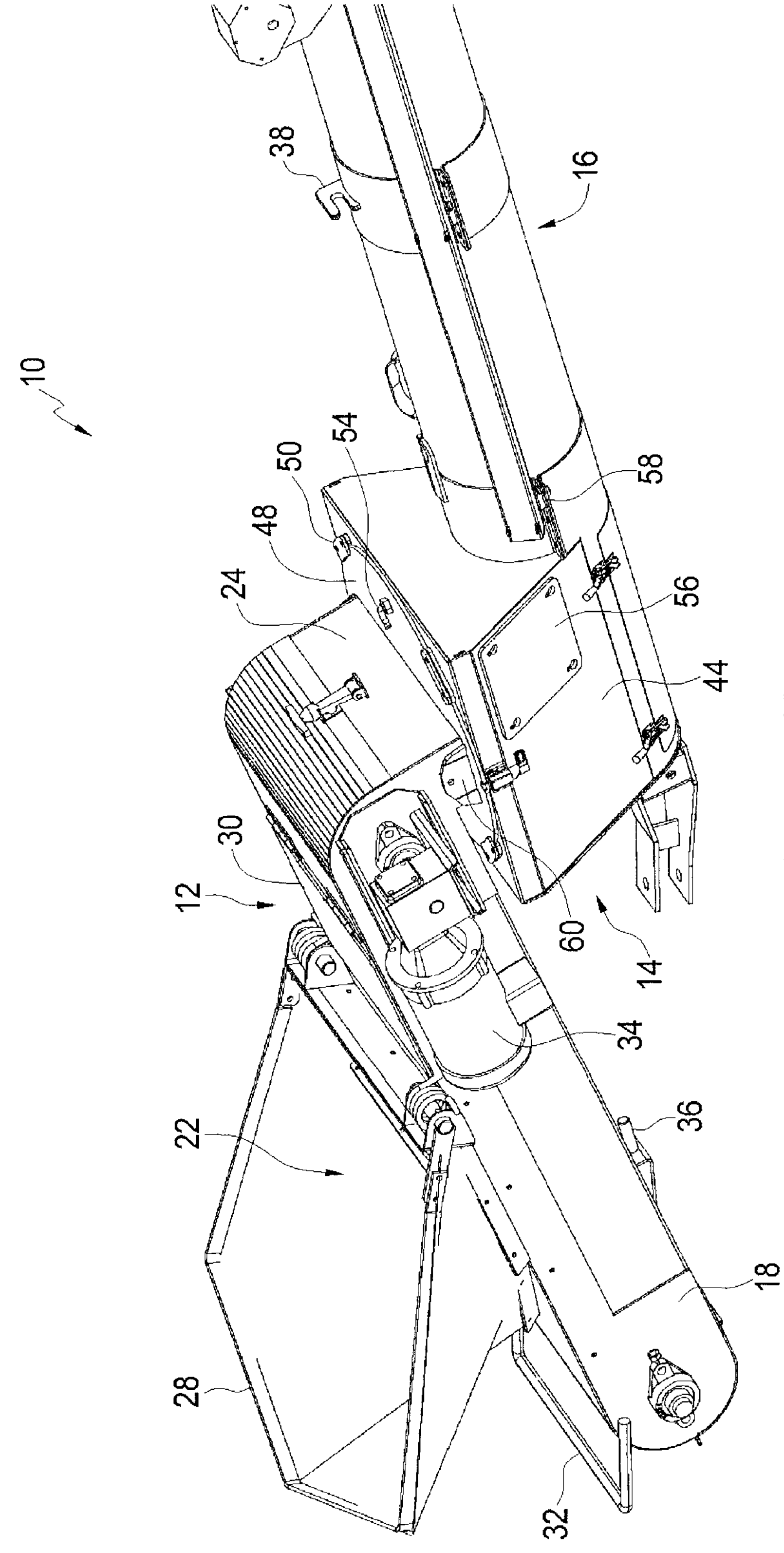
FIG. 1*b* is a rear perspective view of the apparatus of FIG. 1*a;*
Figure 2A:
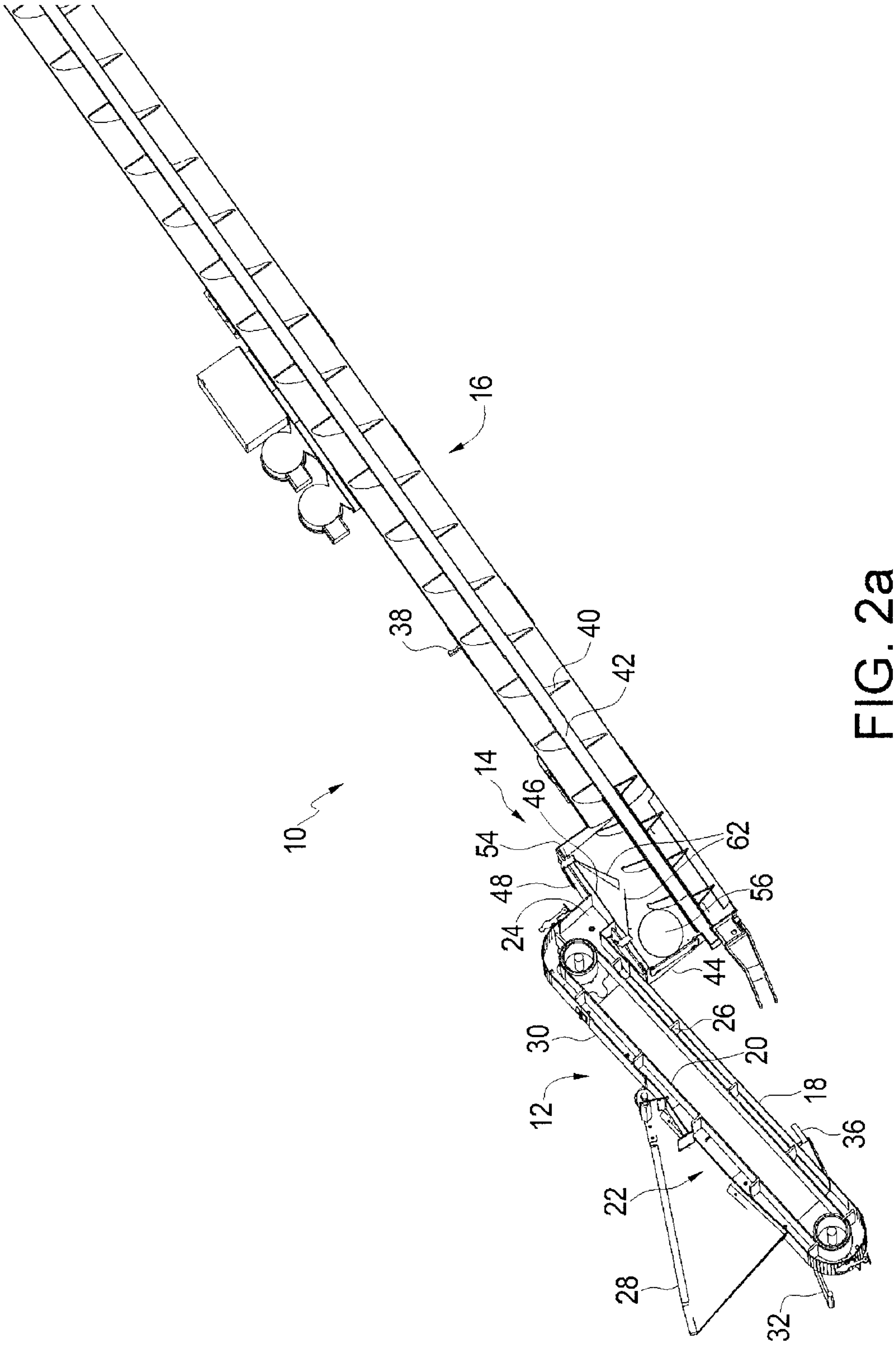
FIG. 2*a* is a side cross-sectional view, slightly in front perspective, of the apparatus of FIG. 1*a;*
Figure 2B:
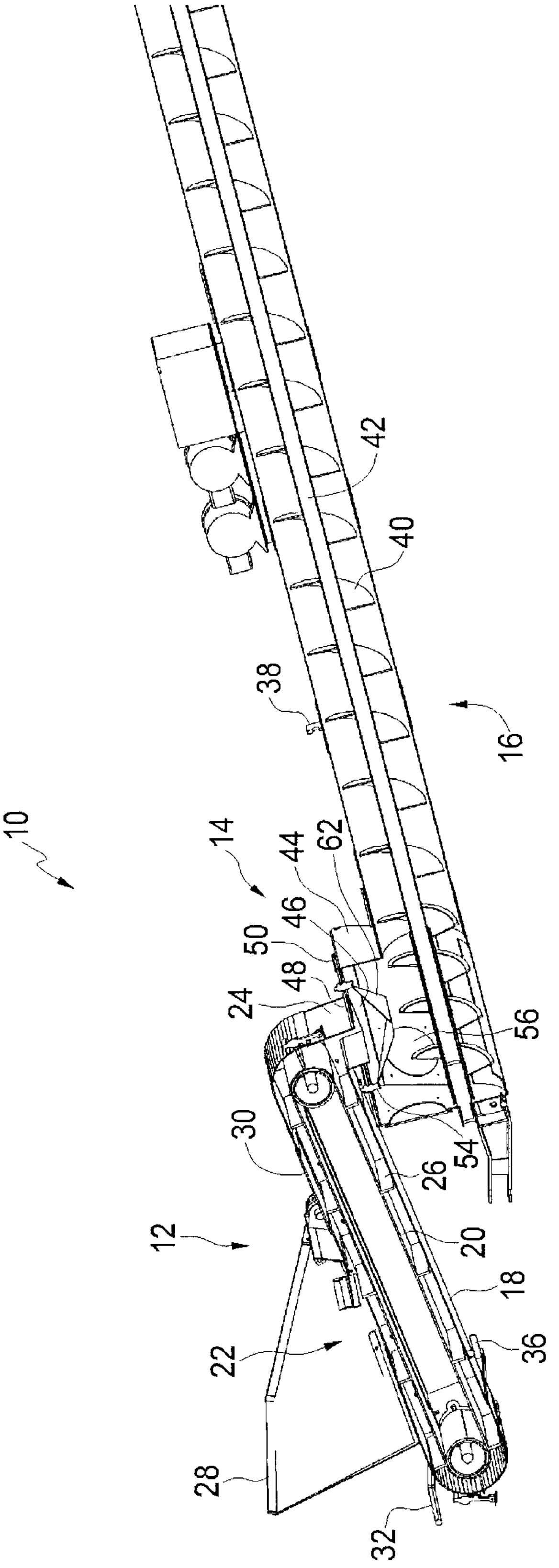
FIG. 2*b* is a side cross-sectional view, slightly in rear perspective, of the apparatus of FIG. 1*a;*
Figure 3:
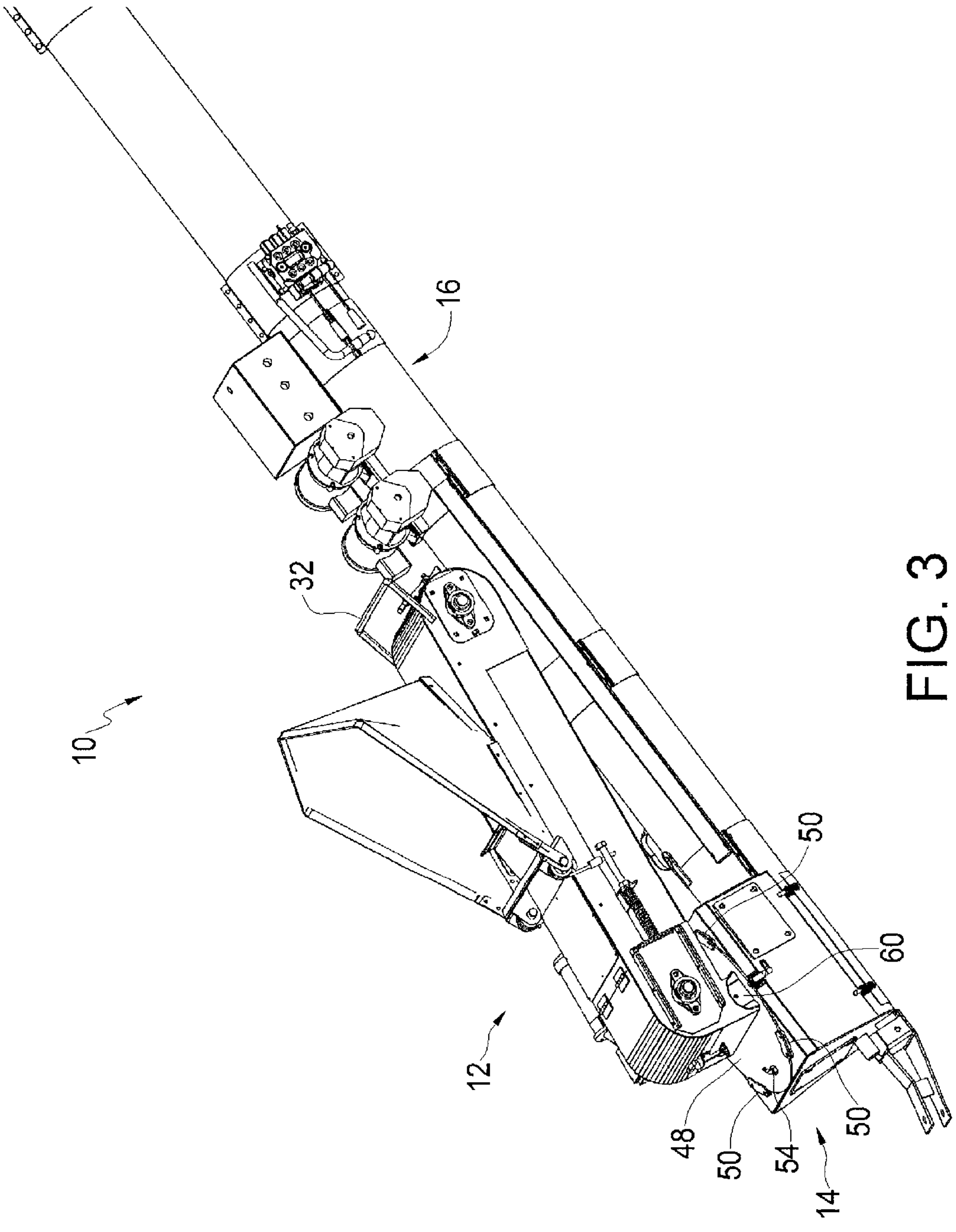
FIG. 3 is a front perspective view of the apparatus of FIG. 1*a*, in the retracted position.

As can best be seen in FIGS. 1*b* and 3, the mounting tabs 60 are used to mount the metering device 12 on the rotatable plate 48 of the spray chamber 14. The mounting tabs 60 are bolted to the outside of the metering device 12 and the metering device can then rotate with the rotatable plate 48 and the nozzles 54 mounted thereon. As the central opening 64 is positioned above the aperture 46, seed can fall down from the metering device outlet 24 downwardly through the central opening 64 and aperture 46 into the interior of the spray chamber 14. As can be seen in FIGS. 2*a* and 2*b*, a treatment spray 62 is directed from the nozzles 54 at an angle toward the centre of the spray chamber 14 interior to coat the seeds as they fall.

While the metering device 12 is mounted on top of the spray chamber 14, the spray chamber 14 itself is connected to the auger 16 by means of securing means 58. Once all three primary components are thus connected, the auger 16 and spray chamber 14 are firmly and non-rotatably connected whereas the metering device 12 is rotatably connected to the upper surface of the spray chamber 14. The metering device 12 can then be manually rotated between the extended and retracted positions without requiring movement of the spray chamber 14 or auger 16.

Once the apparatus 10 has thus been formed, the novel functionality becomes clear. Assuming that the apparatus 10 begins in the retracted or transport position shown in FIGS. 3 through 4*b*, a user would need to rotate the metering device 12 into the operational orientation shown in FIGS. 1*a* through 2*b*. In order to do this, the user would position the auger 16 adjacent a hopper-type bin or similar seed storage equipment. The user would then grab the handle 32 and manually rotate the metering device 12 to the extended position, which is possible due to its mounting on the rotatable plate 48. It is also within the scope of the present invention to provide powered means for rotating the metering device 12 between the first (retracted) and second (extended) positions. It should be noted that the metering device 12 can be rotated into various angles to the long axis of the auger 16, not being limited to a 180 degree extension since the nozzles 54 are connected to the rotatable plate 48, although the number of nozzle supply lines and their arrangement will limit the rotation to an extent determined by the specific arrangement on a given apparatus. The collar/hopper 28 of the metering device 12 would then be positioned immediately under the bin outlet; it is possible that the metering device 12 could be rotated into position while under the bin, but this would require a bin arrangement with sufficient clearance. The user would then power up the conveyor 20 of the metering device 12 and the shaft 42 of the auger 16. Upon opening the bin outlet, seed would fall through the seed intake 22 onto the conveyor 20 and be moved laterally away from the bin outlet by means of the cleats 26. The seed would then be dumped from the seed outlet 24 through the central opening 64 and the aperture 46 into the spray chamber 14 interior, where the seed would be sprayed with treatment by the nozzles 54 before contacting the screw 40. As the nozzles 54 are located in the rotatable plate 48 and thus rotate with the metering device 12, the angle of treatment spray 62 would be consistent even if the metering device 12 was not fully extended parallel to the long axis of the auger 16. The treated seed would then be displaced upwardly through the auger 16 interior, thus more thoroughly spreading the treatment on the seeds, before being deposited into the desired storage location such as a grain truck bin.

Figure 4A:
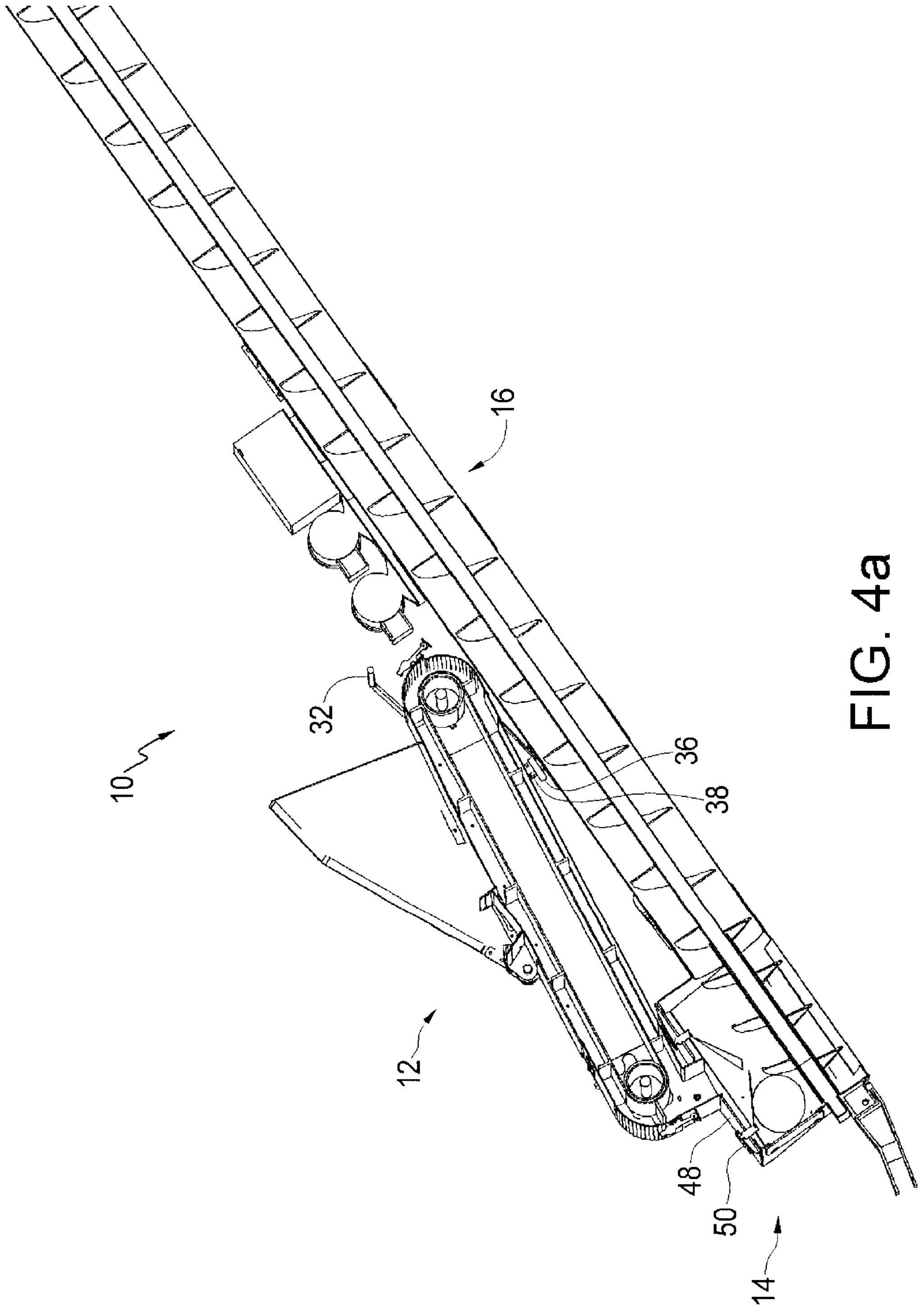
FIG. 4*a* is a side cross-sectional view, slightly in front perspective, of the apparatus of FIG. 3.
Figure 4B:
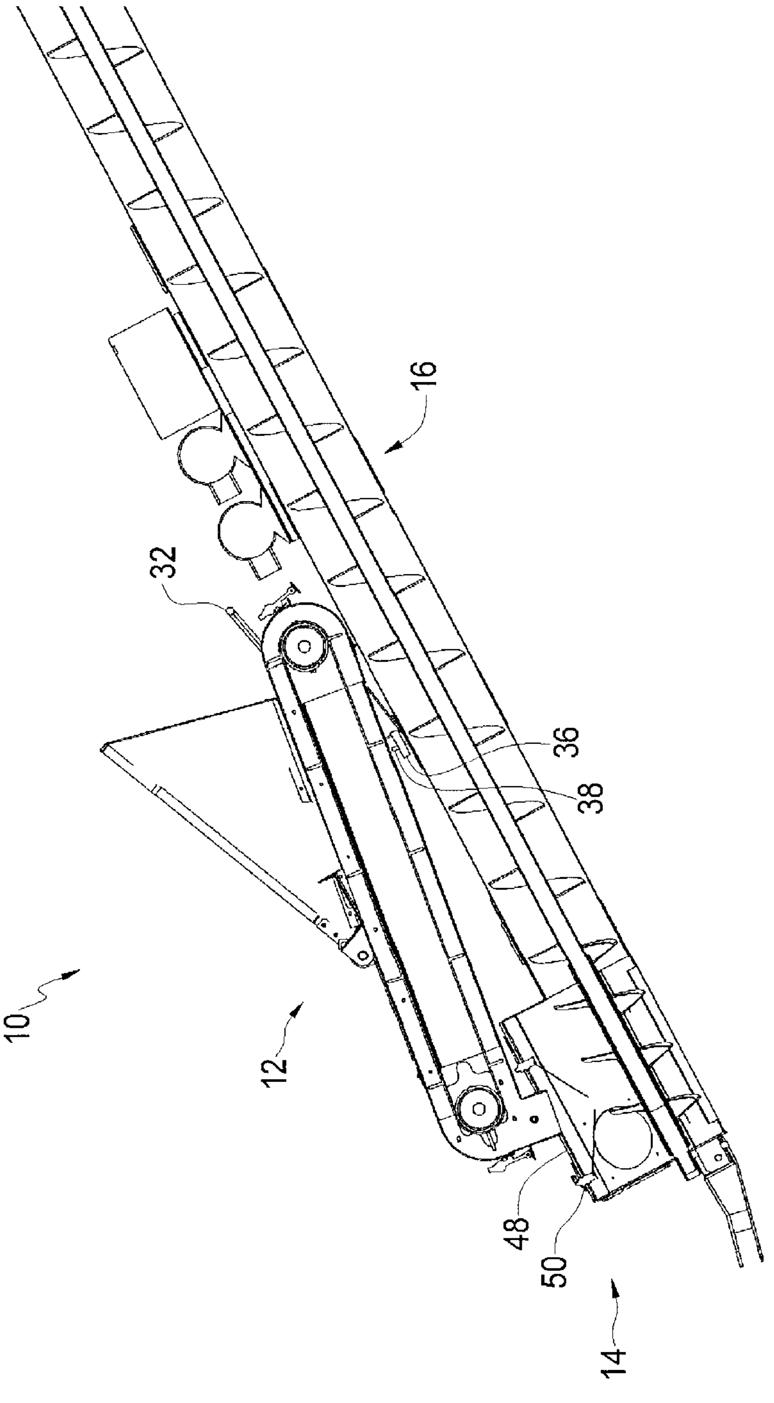
FIG. 4*b* is a side cross-sectional view of the apparatus of FIG. 3.

When it is desired to cease the metering and treating operation, the apparatus 10 can be powered down and the metering device 12 can be rotated by means of the handle 32 (or using an alternative motor-driven means) into the retracted or transport position, which is shown in FIGS. 3 through 4*b*, until the bolt 36 engages the recess 38 and thus holds the metering device 12 in place against the side of the auger 16. While a bolt/recess configuration has been illustrated, it will be clear to those skilled in the art that other retention means are possible within the scope of the present invention. With the metering device in this retracted position, the apparatus 10 can be transported in a conventional manner by moving the auger 16. It will however be clear to those skilled in the art that the metering device 12 need not be rotated a full 180 degrees to allow mating of the bolt 36 and recess 38 in order to move the apparatus 10, as it may be possible to transport the apparatus 10 even if the metering device 12 is not fully retracted against the auger 16.

Referring now in detail to FIGS. 7*a* through 10*e*, an apparatus 110 according to a second exemplary embodiment of the present invention is illustrated. The apparatus 110 is shown in the extended position in FIGS. 7*a* through 7*e*, and in the retracted position in FIGS. 8*a* through 8*e*.

The apparatus 110 comprises a metering device 112 generally in accordance with the Bardi disclosure, a spray chamber 114 and an auger 116, similar to the first exemplary embodiment described above. The metering device 112 comprises a conveyor 120 within a housing 118, and the conveyor 120 is provided with cleats 126 configured to move seed on the top of the conveyor 120 from the seed intake 122 (which receives seed through the collar or hopper 128 which is provided with lift-assist straps or springs 129) to the seed outlet 124. A conventional motor 134 is shown in the illustrated embodiment as being mounted on the bottom of the housing 118 for providing power to the conveyor 120, the motor 134 being connected to a power source and a controller in a manner determinable by those skilled in the art. The housing is provided with an observation window 130, a handle 132 and a bolt 136 (with recess 138 on the auger 116).

The auger 116 comprises a screw 140 formed on a shaft 142, the shaft 142 powered by conventional means. The intake end of the shaft 142 and screw 140 project past the intake end of the auger 116 and are located in the spray chamber 114, as was the case in the first exemplary embodiment described above.

The spray chamber 114 comprises a housing 144, which housing 144 can be seen in detail in FIGS. 10*a* through 10*e*. The housing 144 is provided with a circular aperture 146 on an upper surface thereof, surrounded at spaced intervals by retention tabs 150. The housing 144 also comprises a plate 156 removable for maintenance of the nozzles.

Figure 9A:
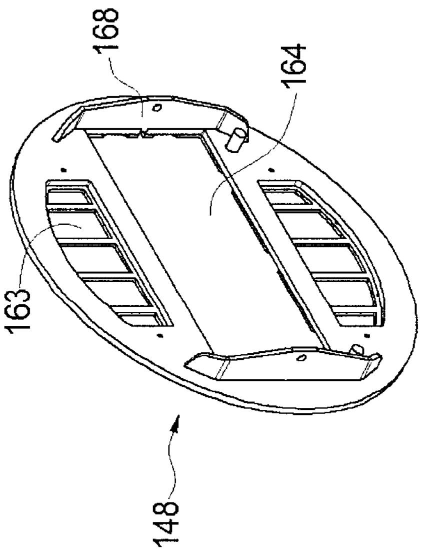
FIGS. 9*a*, 9*b*, 9*c*, 9*d* and 9*e* are detailed views of a stepped plate according to the second embodiment of the present invention.
Figure 9B:
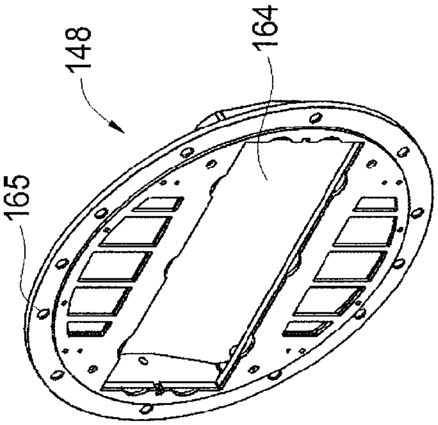
Figure 9C:
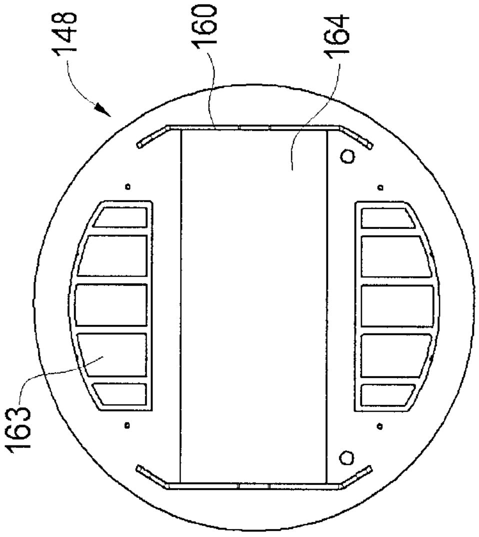
Figure 9D:
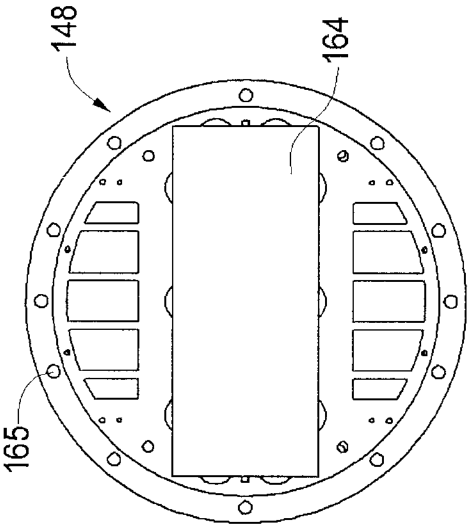
Figure 9E:
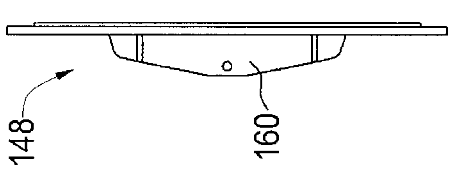
Figure 10A:
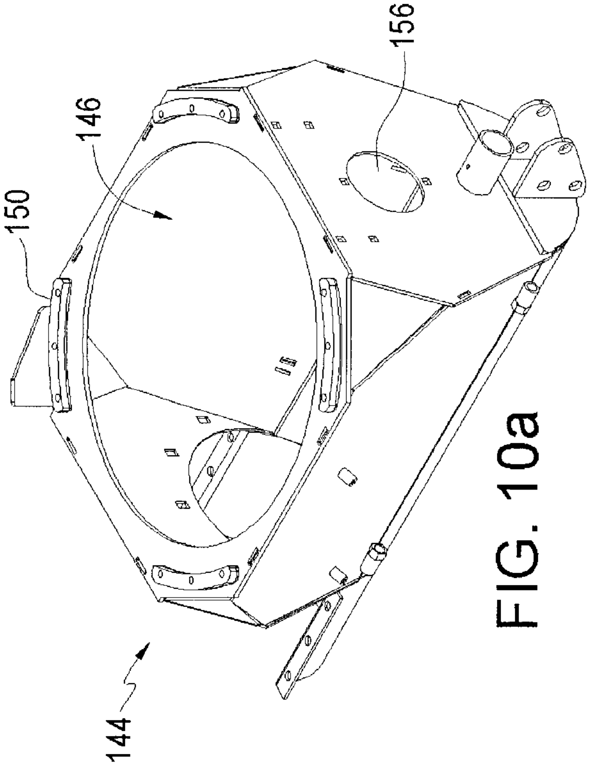
FIGS. 10*a*, 10*b*, 10*c*, 10*d* and 10*e* are detailed views of a spray chamber housing according to the second embodiment of the present invention.
Figure 10B:
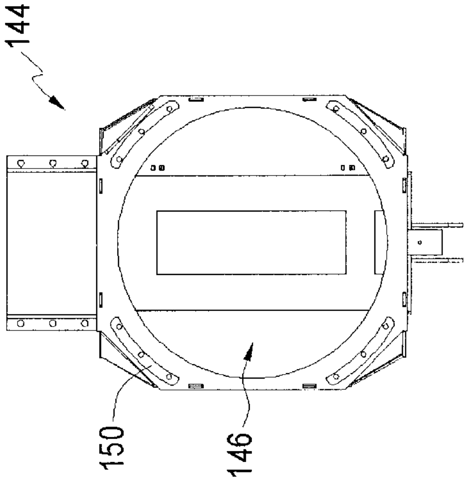
Figure 10C:
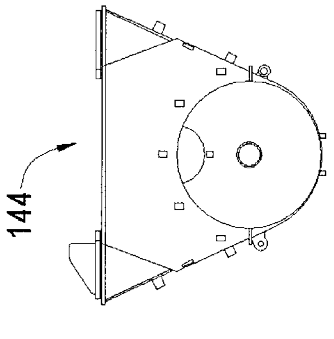
Figure 10D:
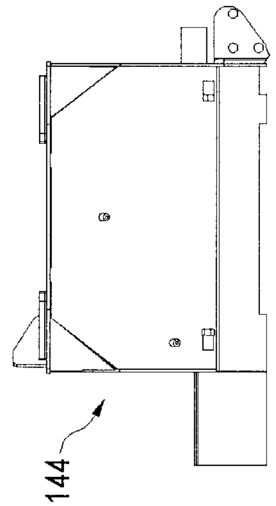
Figure 10E:
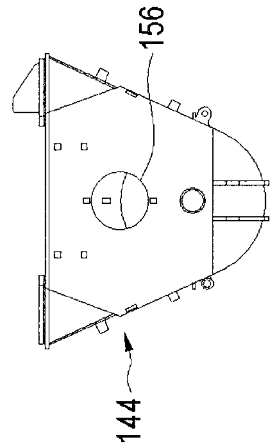

The spray chamber 114 also comprises a coupler in the form of a rotatable stepped plate 148 which is circular in plan and of larger diameter than the aperture 146, which stepped plate 148 can be seen in detail in FIGS. 9*a* through 9*e*. Unlike the rotatable plate 48 of the first exemplary embodiment described above, the stepped plate 148 comprises an upper plate and a lower plate, the upper plate being of larger diameter, as can best be seen in FIGS. 9*b* and 9*e*; it has been found that this design may provide an improved seal to help prevent unwanted release of treatment outside the spray chamber 114. The stepped plate 148 sits on top of the aperture 146 and is held in place by the tabs 150, with sufficient gap between the tabs 150 and the stepped plate 148 to allow the latter to rotate in place while still being held in position over the aperture 146. The stepped plate 148 is also provided with a series of peripheral recesses 165, as can be seen in FIGS. 9*b* and 9*d*, which are configured to receive plastic discs (not shown); the plastic discs thus act as a friction reducing mechanism between the stepped plate 148 and the upper surface of the spray chamber 114. The stepped plate 148 comprises a central opening 164, two peripheral openings 163, and two mounting tabs 160. The central opening 164 is positioned above the aperture 146.

The mounting tabs 160 are used to mount the metering device 112 on the stepped plate 148 of the spray chamber 114. The mounting tabs 160 are bolted to the outside of the metering device 112 and the metering device 112 can then rotate with the stepped plate 148. As the central opening 164 is positioned above the aperture 146, seed can fall down from the metering device outlet 124 downwardly through the central opening 164 and aperture 146 into the interior of the spray chamber 114. A treatment spray can then be directed from the nozzles toward the centre of the spray chamber 114 interior to coat the seeds as they fall. The nozzles are preferably mounted to a plastic plate (not shown) that is inserted into at least one of the peripheral openings 163, the plastic plate resting on the slots in the lower plate of the stepped plate 148, and there are preferably two nozzles.

While the metering device 112 is mounted on top of the spray chamber 114, the spray chamber 114 itself is connected to the auger 116 by means of securing means 158.

Figure 11A:
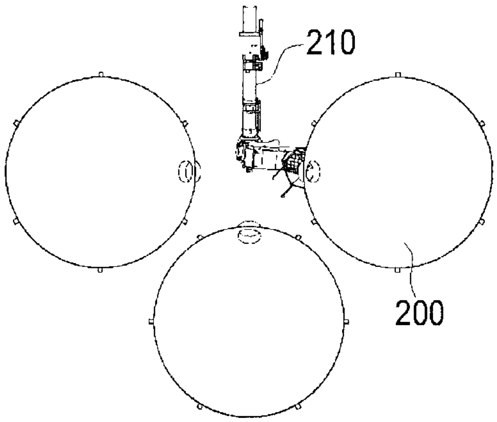
FIGS. 11*a*, 11*b*, 11*c*, 11*d* and 11*e* are views of an apparatus according to the present invention positioned adjacent a bin for metering and treating.
Figure 11D:
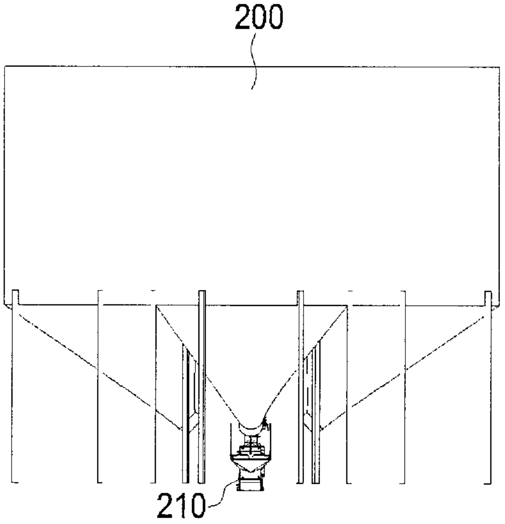
Figure 11B:
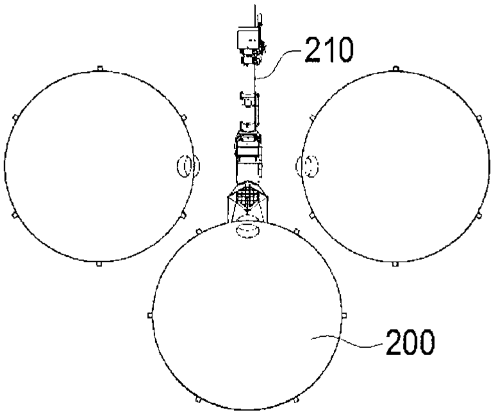
Figure 11E:
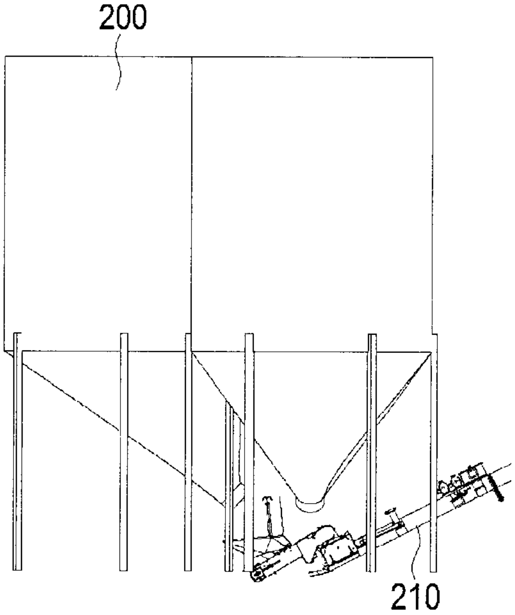
Figure 11C:
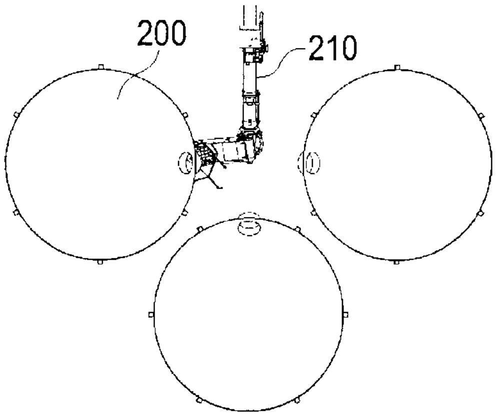

Turning finally to FIGS. 11*a* through 11*e*, positioning of an exemplary apparatus 210 beneath one or more bins 200 is illustrated. As can be seen in these Figures, a plurality of bins 200 are commonly located together in side-by-side or grouped fashion. When employing the apparatus 210 to meter and treat seed or other agricultural granules housed in one or more of the bins 200, the metering device of the apparatus 210 is first moved into the extended position, as described above. Once in the extended position, the apparatus 210 can be positioned under the outlet of a bin 200, as can best be seen in FIG. 11*e*. The apparatus 210 can then be operated as described above. In the event that bins 200 are grouped in a cluster as illustrated in FIGS. 11*a* through lie, the apparatus 210 can be centrally positioned and the metering device rotated between the bins 200 as desired, thus providing a significant advantage.

The foregoing is considered as illustrative only of the principles of the invention. Thus, while certain aspects and embodiments of the invention have been described, these have been presented by way of example only and are not intended to limit the scope of the invention. The scope of the claims should not be limited by the exemplary embodiments set forth in the foregoing, but should be given the broadest interpretation consistent with the specification as a whole.

The invention claimed is:

1. An apparatus for metering and treating agricultural granules, the apparatus comprising:

a conveyance device having an inlet;

a treatment chamber comprising a housing fixedly coupled to the conveyance device adjacent the inlet of the conveyance device, the treatment chamber configured to apply treatment to agricultural granules; and a metering device configured to receive agricultural granules at an intake end and eject the agricultural granules at an outlet end, the inlet end of the metering device is laterally offset from the outlet end, wherein the outlet end of the metering device is rotatably coupled on an upper mounting surface of the housing of the treatment chamber such that the agricultural granules ejected from the outlet end pass through the treatment chamber for application of the treatment therein and thence into the inlet of the conveyance device;

wherein the metering device rotates with respect to the treatment chamber between at least a first position for positioning under an agricultural granule source and a second position adjacent the conveyance device.

2. The apparatus of claim 1 wherein the agricultural granules are selected from the group consisting of seeds and granular field additives.

3. The apparatus of claim 1 wherein the treatment is a liquid treatment selected from the group consisting of fertilizers, herbicides, insecticides, pesticides, nematicides and fungicides.

4. The apparatus of claim 1 wherein the conveyance device is selected from the group consisting of an auger, a mixer and a conveyor.

5. The apparatus of claim 1 wherein the metering device is rotatably coupled to the treatment chamber by means of a coupler allowing rotational movement of the metering device relative to the treatment chamber in a plane parallel to the upper mounting surface, such that the metering device can rotate at least 180 degrees around the treatment chamber.

6. The apparatus of claim 5 wherein the coupler comprises a round disc having opposed first and second generally flat surfaces, the metering device mounted on the first generally flat surface, the second generally flat surface held slidably against the upper mounting surface of the treatment chamber by at least one retention tab, such that the round disc is rotatable while slidably retained against the upper mounting surface.

7. The apparatus of claim 5 wherein the coupling device comprises a stepped plate having opposed first and second generally flat surfaces, the metering device mounted on the first generally flat surface, the second generally flat surface held slidably against the upper mounting surface of the treatment chamber by at least one retention tab, such that the stepped plate is rotatable while slidably retained against the upper mounting surface, the first generally flat surface being of larger diameter than the second generally flat surface.

8. The apparatus of claim 1 wherein the metering device comprises a conveyor within a housing, the conveyor configured to transport the agricultural granules from the intake end to the outlet end.

9. The apparatus of claim 8 wherein the metering device comprises a motor for driving the conveyor.

10. The apparatus of claim 4 wherein the conveyance device is an auger and the auger comprises a screw in a casing, the screw configured for rotation on a shaft to displace the agricultural granules away from the inlet, wherein a portion of the screw extends past an inlet end of the casing and into the treatment chamber.

11. The apparatus of claim 1 further comprising a motor to drive rotation of the metering device between the first and second positions.

12. The apparatus of claim 1 wherein the treatment chamber comprises at least one nozzle in communication with a treatment source, the at least one nozzle configured to spray the treatment on the agricultural granules as they pass through the treatment chamber.

13. The apparatus of claim 1 wherein the treatment chamber comprises at least one atomizer in communication with a treatment source, the at least one atomizer configured to atomize the treatment on the agricultural granules as they pass through the treatment chamber.

14. The apparatus of claim 5 wherein the coupler comprises at least one nozzle in communication with a treatment source, the at least one nozzle configured to spray the treatment on the agricultural granules as they pass through the treatment chamber.

15. The apparatus of claim 5 wherein the coupler comprises at least one atomizer in communication with a treatment source, the at least one atomizer configured to atomize the treatment on the agricultural granules as they pass through the treatment chamber.

16. The apparatus of claim 5 wherein the coupler and the treatment chamber comprise corresponding apertures allowing the agricultural granules to pass therethrough from the metering devise outlet end into the treatment chamber.

* * * * *